(12) United States Patent
Li

(10) Patent No.: US 10,906,073 B2
(45) Date of Patent: Feb. 2, 2021

(54) ADJUSTABLE FOCUS LASER CLEANING GALVANOMETER, CLEANING SYSTEM AND CLEANING METHOD

(71) Applicant: CHENGDU MRJ-LASER TECHNOLOGY CO., LTD., Chengdu (CN)

(72) Inventor: Gaofeng Li, Zhuozhou (CN)

(*) Notice: Subject to any disclaimer, the term of this patent is extended or adjusted under 35 U.S.C. 154(b) by 138 days.

(21) Appl. No.: 16/122,717

(22) Filed: Sep. 5, 2018

(65) Prior Publication Data

US 2019/0105690 A1   Apr. 11, 2019

(30) Foreign Application Priority Data

Sep. 5, 2017   (CN) .......................... 2017 1 0789053
Aug. 1, 2018   (CN) .......................... 2018 1 0859497

(51) Int. Cl.
| | |
|---|---|
| *B08B 7/00* | (2006.01) |
| *B23K 26/046* | (2014.01) |
| *B23K 26/082* | (2014.01) |
| *B23K 26/36* | (2014.01) |
| *G02B 7/04* | (2006.01) |
| *G02B 26/10* | (2006.01) |
| *G02B 27/09* | (2006.01) |

(52) U.S. Cl.
CPC .......... *B08B 7/0042* (2013.01); *B23K 26/046* (2013.01); *B23K 26/082* (2015.10); *B23K 26/36* (2013.01); *G02B 7/04* (2013.01); *G02B 26/10* (2013.01); *G02B 27/0955* (2013.01)

(58) Field of Classification Search
CPC .. B08B 7/0042; B23K 26/046; B23K 26/082; B23K 26/36; G02B 26/10; G02B 27/0955; G02B 7/04
See application file for complete search history.

(56) References Cited

U.S. PATENT DOCUMENTS

| | | | | |
|---|---|---|---|---|
| 5,257,706 A | * | 11/1993 | McIntyre | ............... B23K 26/16 219/121.61 |
| 5,998,759 A | * | 12/1999 | Smart | ................ B23K 26/0853 219/121.69 |
| 6,337,462 B1 | * | 1/2002 | Smart | ................ B23K 26/0853 219/121.68 |

(Continued)

FOREIGN PATENT DOCUMENTS

DE    102005033605   *   1/2007

OTHER PUBLICATIONS

EP3098910 translation (Year: 2020).*
DE102005033605 (Year: 2020).*

*Primary Examiner* — Ibrahime A Abraham
*Assistant Examiner* — Frederick F Calvetti
(74) *Attorney, Agent, or Firm* — W&K IP

(57) ABSTRACT

Adjustable-focus laser cleaning galvanometers, cleaning systems, and cleaning methods in the field of laser cleaning are disclosed. According to aspects herein, an adjustable-focus laser cleaning galvanometer includes a body, a laser, an adjustable lens set and a galvanometer. The adjustable lens set and the laser may be mounted on the body. In some implementations, the adjustable lens set may be configured to convert or transform a laser beam emitted from the laser into a focused beam and adjust the focal length of the beam. Further, the galvanometer may be mounted on the body and can rotate or swing on the body.

14 Claims, 12 Drawing Sheets

(56) References Cited

U.S. PATENT DOCUMENTS

| | | | |
|---|---|---|---|
| 6,791,059 B2* | 9/2004 | Smart | B23K 26/0853 |
| | | | 219/121.68 |
| 6,878,899 B2* | 4/2005 | Smart | B23K 26/0853 |
| | | | 219/121.61 |
| 8,121,717 B2* | 2/2012 | Idaka | G05B 19/4086 |
| | | | 700/98 |
| 9,375,974 B2* | 6/2016 | Ream | B23K 26/082 |
| 9,703,111 B2* | 7/2017 | Miyazaki | B23K 26/0648 |
| 2002/0093997 A1* | 7/2002 | Smart | B23K 26/0622 |
| | | | 372/25 |
| 2005/0011872 A1* | 1/2005 | Smart | B23K 26/0622 |
| | | | 219/121.68 |
| 2005/0173385 A1* | 8/2005 | Smart | B23K 26/40 |
| | | | 219/121.61 |
| 2012/0145685 A1* | 6/2012 | Ream | B23K 26/0821 |
| | | | 219/121.67 |

* cited by examiner

ADJUSTABLE FOCUS LASER CLEANING GALVANOMETER, CLEANING SYSTEM AND CLEANING METHOD

CROSS-REFERENCE TO RELATED APPLICATIONS

This application claims benefit/priority of Chinese Patent Application No. 201710789053.X, entitled "Adjustable Focus Laser Cleaning Galvanometer", filed Sep. 5, 2017, and of Chinese Patent Application No. 201810859497.0, entitled "Adjustable Focus Laser Cleaning Galvanometer, a Cleaning System and a Cleaning Method", filed on Aug. 1, 2018, which are incorporated herein by reference in entirety.

BACKGROUND

Technical Field

The disclosed technology relates to the technical field of laser cleaning and laser cleaning devices, such as to adjustable focus laser cleaning galvanometers, cleaning systems and cleaning methods.

Background Art

Current laser cleaning scanners typically have a fixed focal depth. The beams output by a laser pass through a galvanometer as well as a field lens which converges the parallel beams. In this way, a high-energy focal spot is formed to clean the object surface by vaporizing or stripping the rust or attachments/debris on the object surface. As such, a non-adjustable focal depth of the field lens entails only a fixed distance between the exiting port and the surface to be cleaned.

Current laser cleaning scanners are deficient at least in one or more of the following aspects.

A fixed focal length leads to a fixed distance between the laser exiting port and the surface to be cleaned. If the object to be cleaned has a deep surface to be cleaned, such laser is ineffective and/or inapplicable for use. Hence, the flexibility and scope of application of such laser cleaners are limited.

SUMMARY OF ASPECTS OF THE DISCLOSURE

An objective of aspects of the disclosed technology is, for example, to provide an adjustable focus laser cleaning galvanometer to address the technical problems and issues related to situations where the focal length of known laser cleaning scanners are not adjustable.

Another objective of aspects of the disclosed technology is to provide a cleaning system which includes the adjustable focus laser cleaning galvanometer and has all the functions as the adjustable focus laser cleaning galvanometer does.

A further objective of the disclosed technology is to provide a cleaning method by which more efficient cleaning is possible.

The embodiments of the disclosed technology may be implemented in various ways, such as the following.

According to embodiments of the disclosed technology, an adjustable focus laser cleaning galvanometer which includes a body, a laser, an adjustable lens set and a galvanometer may be provided.

In some implementations, one or both of the adjustable lens set and/or the laser may be mounted on the body;

The adjustable lens set may be configured to convert a laser beam emitted from the laser into a focused beam and to adjust the focal length of the beam.

According to some aspects, the galvanometer may be mounted on the body and may swing, pivot and/or rotate on the body.

Optionally, the adjustable lens set may include fixed lenses and a movable lens.

The movable lens may be movable axially relative to the fixed lenses.

Optionally, a mechanism such as an adjusting knob may be provided on the adjustable lens set.

Such mechanism or adjusting knob may be configured to adjust the distance between the movable lens and the fixed lenses and thus to adjust the focal length of the beam.

Optionally, the adjustable focus laser cleaning galvanometer may further include a first heat dissipation module which is provided in the periphery of the adjustable lens set.

Optionally, the adjustable focus laser cleaning galvanometer may further include a second heat dissipation module which is provided to be close to the laser.

Optionally, the adjustable lens set may be disposed between the laser and the galvanometer.

Optionally, the galvanometer may be disposed between the laser and the adjustable lens set.

Optionally, a reflector may be provided between the galvanometer and the adjustable lens set.

Optionally, along the path of light emitted from the laser, the adjustable lens set, the reflector and the galvanometer may be disposed in this order. Here, the light emitted from the laser may be referred to as first light, the light emitted from the galvanometer being second light. There is an included angle, a, between such first light and second light.

Optionally, this angle, a, may be in the range $8° \le a \le 45°$.

Optionally, along the path of light emitted from the laser, the galvanometer, the reflector and the adjustable lens set may be disposed in this order. Here, the light emitted from the laser being referred to as first light, with the light emitted from the adjustable lens set being third light. There is an included angle, b, between the first light and the third light.

Optionally, this angle, b, may be in the range $8° \le b \le 45°$.

Optionally, the adjustable focus laser cleaning galvanometer may further include protection, such as a protective cover.

Such protective cover may be disposed in the front of the body.

Optionally, the adjustable focus laser cleaning galvanometer further includes one or more air-flow generation devices, such as an air-blowing fan or comparable device(s).

Such air-flow generation device(s) may be mounted on the body.

Optionally, a handle may be provided on the body.

Optionally, the galvanometer may include a galvanometer lens and a galvanometer motor. The galvanometer motor may be mounted on the body and may be configured to drive the galvanometer lens to swing.

Optionally, the rotation axis of the output shaft of the galvanometer motor may be parallel to or coincident with the reflecting surface of the galvanometer lens. Here, the light emitted from the laser is referred to as first light, and there is an included angle θ between the first light and the rotation axis.

Optionally, the angle, θ, may be between $45° \le \theta \le 82°$.

Optionally, the light emitted from the laser is 'first' light, and the light finally emitted from the adjustable focus laser cleaning galvanometer being 'fourth' light. There is an included angle c between the first light and the fourth light.

Optionally, the angle, c, may be between 8°≤c≤45°.

Optionally, the adjustable focus laser cleaning galvanometer further includes a water cooling system which includes a cooling source and a water cooling pipe communicated with the cooling source and the cooling pipe is disposed within the body.

Optionally, the adjustable focus laser cleaning galvanometer may further include a ranging sensor and a controller. The ranging sensor is mounted on the body and is configured to detect the distance between the body and the surface to be cleaned and feed a detection signal back to the controller which is configured to perform control over the adjustable lens set and/or the galvanometer according to the detection signal.

An embodiment of the disclosed technology further provides a cleaning system which includes the above adjustable focus laser cleaning galvanometer.

An embodiment of the disclosed technology further provides a cleaning method which uses the above adjustable focus laser cleaning galvanometer. The method may include:

directing light finally emitted from the adjustable focus laser cleaning galvanometer to a to-be-cleaned surface in a way that there is an included angle between the light and a plane perpendicular to the to-be-cleaned surface; and performing control over the adjustable lens set to adjust a focal length of a beam.

Compared with the prior art, embodiments of the disclosed technology provide implementations having one or more of the following beneficial effects.

In the adjustable focus laser cleaning galvanometer provided by the embodiments of the disclosed technology, the adjustable lens set converts a laser beam emitted from the laser into a focused beam and adjusts the focal length of the beam. Therefore, implementations may enable fine cleaning with different focal depths and power levels for differently dimensioned objects, may meet/satisfy the requirement for laser cleaning with a large focal depth, may addresses technical problems associated with the focal length of known laser cleaning scanners not being adjustable, and thus are beneficial and innovative.

BRIEF DESCRIPTION OF THE DRAWINGS

In order to more clearly illustrate the technical solutions provided in the embodiments of the disclosed technology, drawings necessary for the embodiments will be briefly described below. It should be understood that the following drawings merely show some embodiments of the disclosed technology and thus should not be construed as limiting the scope. Other related drawings can be obtained by those ordinarily skilled in the art according to these drawings without paying any creative effort.

REFERENCE NUMERALS

Figure 1:
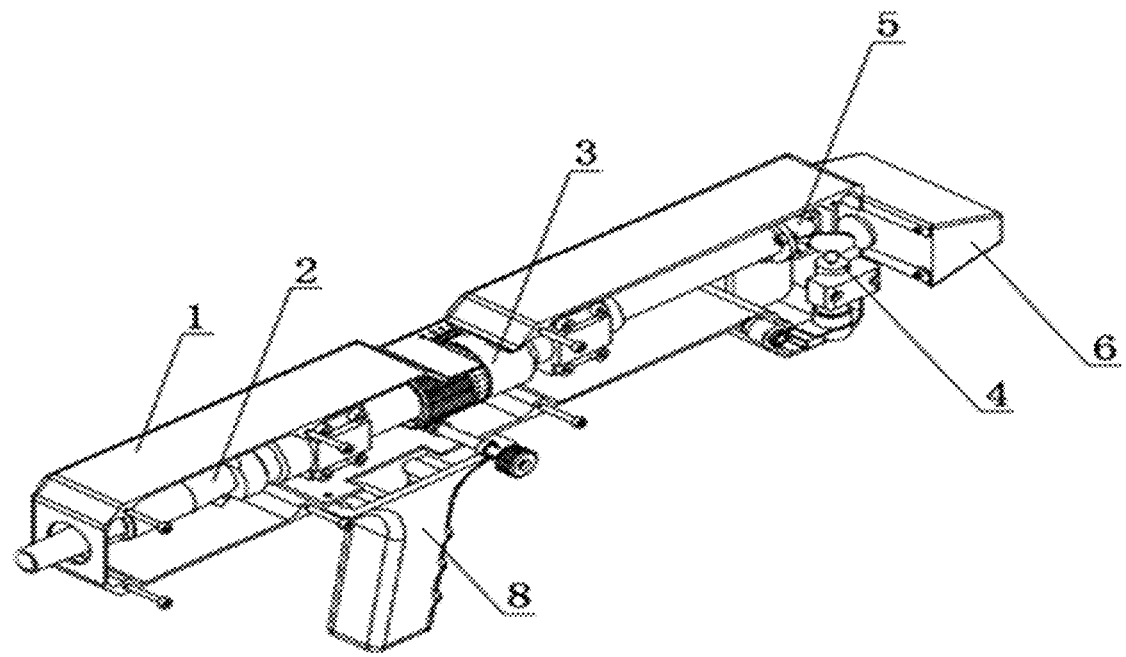
FIG. 1 is a structural schematic diagram of a first adjustable focus laser cleaning galvanometer from a first view provided in an embodiment of the disclosed technology.

1—body; 2—laser; 3—adjustable lens set; 31—fixed lens; 32—movable lens; 4—galvanometer; 41—galvanometer lens; 42—galvanometer motor; 5—reflector; 6—protection cover; 7—air-generating device; 8—handle; 9—adjusting knob; 10—ranging sensor; 11—controller; 12—water cooling system; 13—to-be-cleaned surface; 14—first heat dissipation module; 15—second heat dissipation module.

DETAILED DESCRIPTION OF ILLUSTRATIVE IMPLEMENTATIONS

In order to make objectives, technical solutions and/or advantages of the embodiments of the disclosed technology much clearer, various features provided in the embodiments of the present disclosure will be clearly and comprehensively described with reference to the figures for the embodiments of the disclosed technology. Apparently, the embodiments described below are merely some, but not all of the embodiments of the disclosed technology. Normally, the components of the embodiments of the disclosed technology described and illustrated in the drawings herein can be arranged and designed in various configurations.

Hence, the following detailed description of the embodiments of the disclosed technology provided in the figures is not intended to limit the scope of the present inventions as claimed, but merely shows the selected embodiments of the disclosed technology. All the other embodiments obtained by those ordinarily skilled in the art based on the embodiments provided in the present disclosure without addition of further creative efforts shall fall within the scope of protection of the innovations presented herein.

It should be noted that similar reference signs and letters refer to similar items in the following figures. Therefore, once an item is defined in a figure, it will not be further defined or explained in the following figures.

It is to be noted that in the description of the present disclosure, orientation or positional relations indicated by terms such as "center", "upper", "lower", "left", "right", "vertical", "horizontal", "inner" and "outer" are the orientation or positional relations shown based on the figures, or the conventional orientation or positional relations in the use of the products of the present disclosure, only for facilitating and simplifying description of the present disclosure, rather than indicating or implying that the referred devices or elements must be in a particular orientation or constructed or operated in the particular orientation, and therefore they should not be construed as limiting the disclosed technology.

In addition, terms like "first", "second" and "third" are merely used for distinctive purpose, but should not be construed as indicating or implying relative importance.

Further, terms like "horizontal", "vertical" and "suspended" do not indicate that a component is absolutely horizontal or suspended, but it can be slightly inclined. For example, the term "horizontal" merely means that the direction it indicates is horizontal relative to that indicated by the term "vertical", but does not mean that a structure must be absolutely horizontal, instead, it may be slightly inclined.

It should also be noted that, in the description of the present disclosure, terms like "provide", "mount", "coupled" and "connected" should be interpreted in a broad sense, unless otherwise explicitly specified and defined. For example, a connection could be fixed, detachable, or integrated, or it could be mechanical or electrical, or it could be direct or done via an intermediate medium, or it could be internal communication between two elements. Those ordinarily skilled in the art can understand the specific meanings of the above terms in the disclosed technology according to specific circumstances.

It should be noted that the features in the embodiments of the disclosed technology can be combined without conflict.

Figure 2:
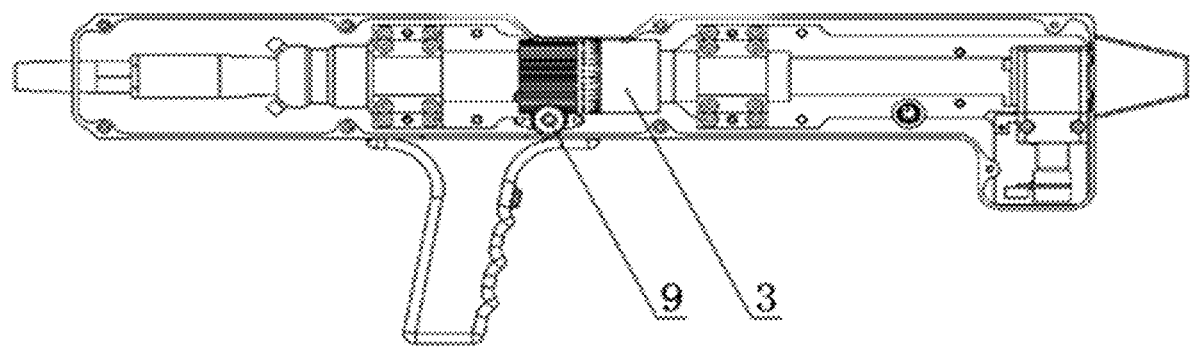
FIG. 2 is a structural schematic diagram of the first adjustable focus laser cleaning galvanometer from a second view provided in an embodiment of the disclosed technology.

Referring to FIG. 1 and FIG. 2, the present embodiment provides a first adjustable focus laser cleaning galvanometer which includes a body 1, a laser 2, an adjustable lens set 3 and a galvanometer 4. Both the adjustable lens set 3 and the laser 2 are provided on the body 1. The adjustable lens set 3 is configured to convert a laser beam emitted from the laser 2 into a focused beam and adjust the focal length of the beam. The galvanometer 4 is provided on the body 1 and the galvanometer 4 may swing on the body 1.

In the existing laser cleaning devices, what travel between the laser isolator and the galvanometer component and between the galvanometer component and the field lens are all laser beams. And it is impossible to adjust the focal length by adjusting the interval therebetween. A fixed focal length leads to a fixed distance between the laser exiting port and the to-be-cleaned surface. If the object to be cleaned has a deep surface to be cleaned, the cleaning might not be so satisfied and the flexibility and applicable scope of laser cleaning are limited.

In the present embodiment, the adjustable lens set 3 is arranged in a way that a laser beam emitted from the laser 2 is converted into a focused beam and that the focal length of the beam can thus be adjusted. Such large focal depth light path design provided by the lens set satisfies the demand for laser cleaning with a large focal depth, leaving the peers, which provide a working focal depth of 100 mm, way behind.

It should be noted that the galvanometer 4 is movably mounted on the body 1 by a galvanometer support, in a way that the galvanometer 4 may swing left and right, and is configured to swing the beams for scanning cleaning.

Figure 6:
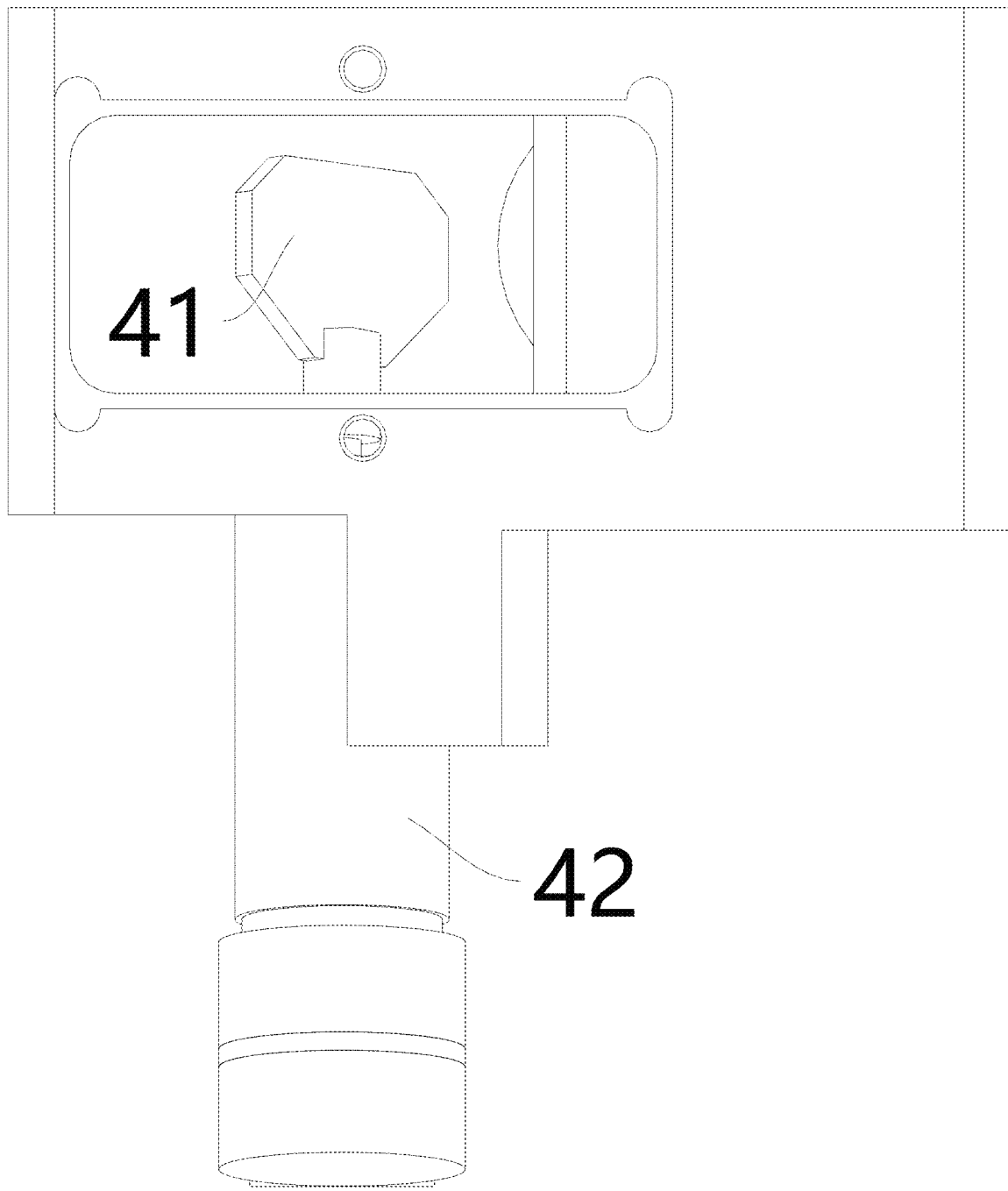
FIG. 6 is a structural schematic diagram of a galvanometer from a first view provided in an embodiment of the disclosed technology.
Figure 7:
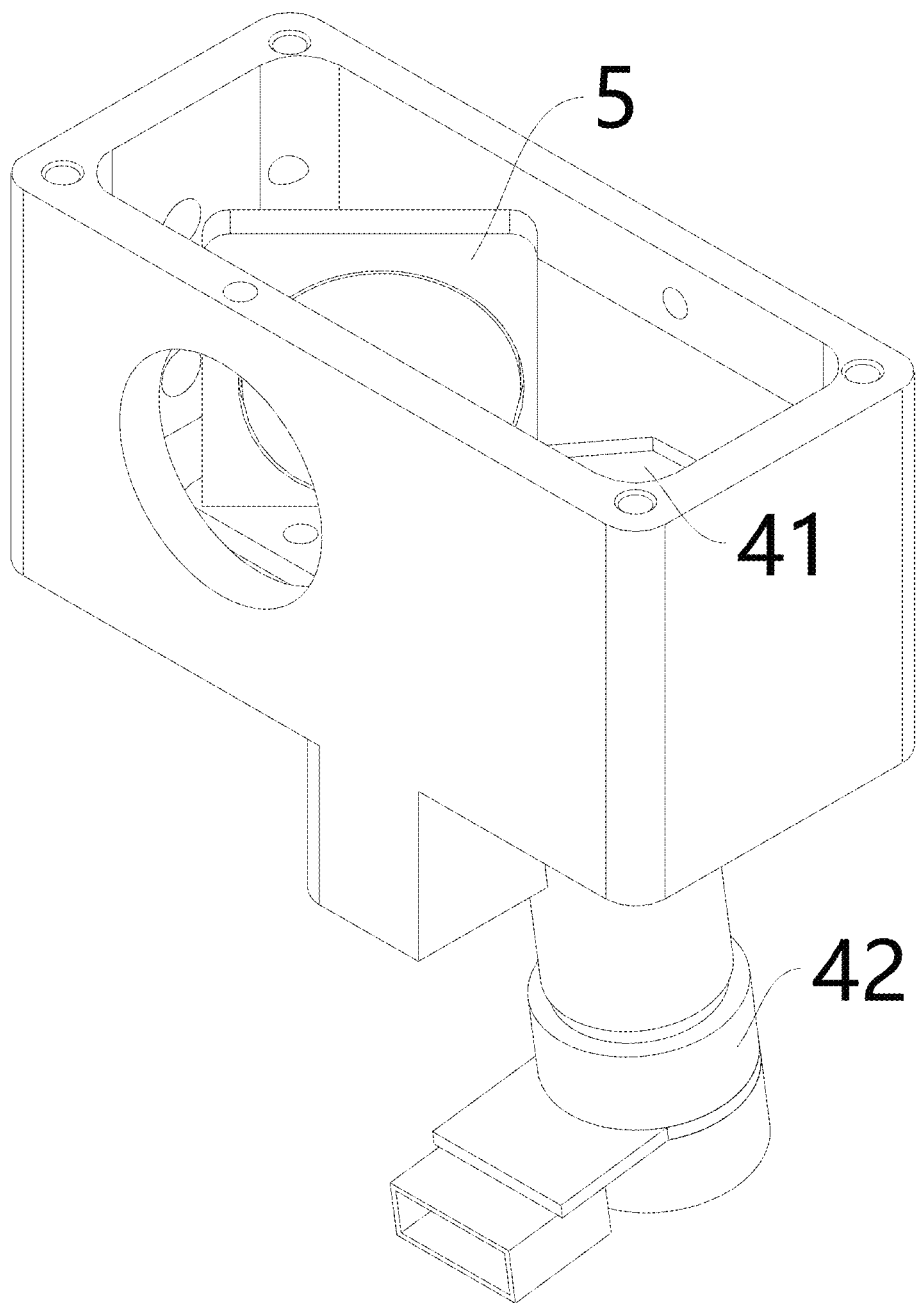
FIG. 7 is a structural schematic diagram of a galvanometer from a second view provided in an embodiment of the disclosed technology.

Specifically, in combination with FIG. 6 and FIG. 7, the galvanometer 4 in the present embodiment includes a galvanometer lens 41 and a galvanometer motor 42. The galvanometer motor 42 is mounted on the body 1 and is configured to drive the galvanometer lens 41 to swing. More specifically, the galvanometer lens 41 is connected to the output shaft of the galvanometer motor 42 by the galvanometer support so as to transmit the driving power.

The described implementation allows the galvanometer lens 41 to swing. Here, it is noted that there are other structures known to an ordinary artisan that may also achieve such effect, though they are not described here in detail.

In addition, the laser 2 is provided with a laser isolator at the laser output port. In this case, the laser isolator is fixed on the body 1. The laser itself is connected to the laser isolator by optical fibers. Here, it is also noted that there are various types of lasers with different wavelengths/bands, and other types of light emitting devices, which may be employed in other embodiments.

It should be noted that the laser itself may be of various types, e.g. solid laser, semiconductor laser and gas laser, it may be pulse laser or continuous laser, and it may have a wavelength/band of 1064 nm and/or other wavelengths/bands.

Figure 4:
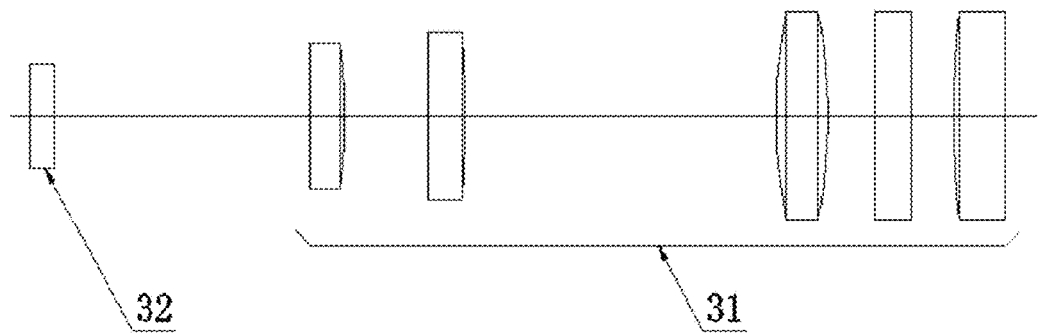
FIG. 4 is a schematic diagram of a first arrangement of internal lenses of the adjustable lens set in the first adjustable focus laser cleaning galvanometer provided in an embodiment of the disclosed technology.
Figure 5:
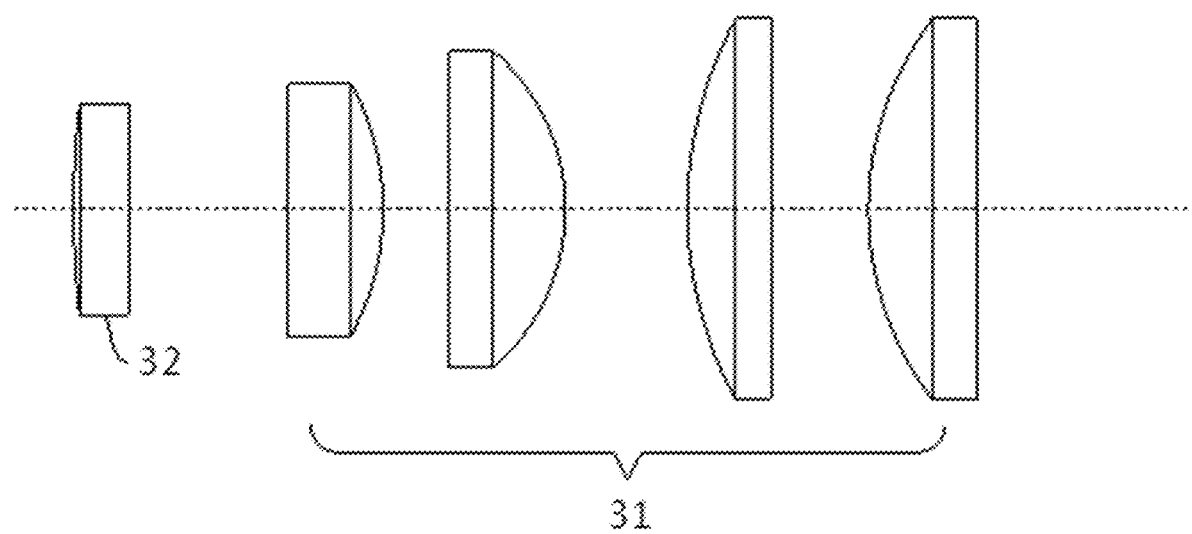
FIG. 5 is a schematic diagram of a second arrangement of internal lenses of the adjustable lens set in the first adjustable focus laser cleaning galvanometer provided in an embodiment of the disclosed technology.

In the present embodiment, the adjustable lens set 3 includes fixed lenses 31 and a movable lens 32 and the movable lens 32 is axially movable relative to the fixed lenses 31, as shown in FIG. 4 and FIG. 5.

In the present embodiment, the movement of the movable lens 32 in the axial direction can allow focal length adjustment for the laser beams.

In combination with such aspects, FIG. 4 shows five fixed lenses 31 and FIG. 5 shows four fixed lenses 31. In actual implementation, the number of lens is not limited. It should be noted that the fixed lenses 31 may also be referred to as lens combination and the movable lens 32 may also be referred to as adjustable lens.

Figure 3:
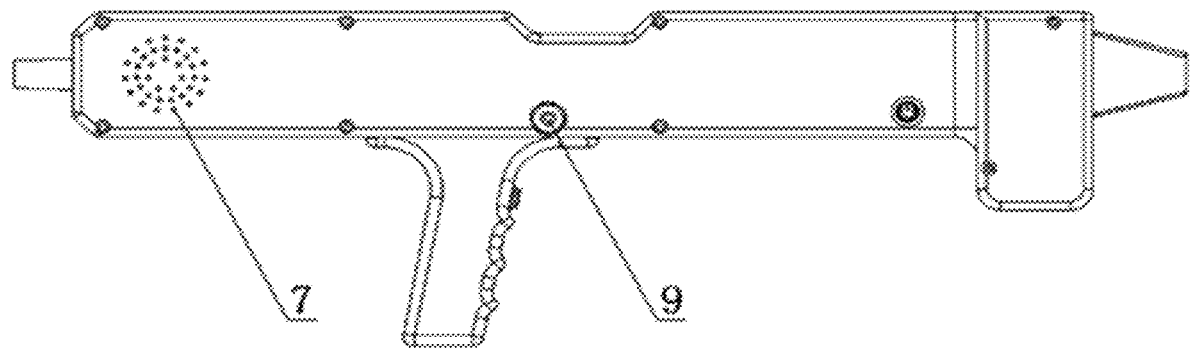
FIG. 3 is a structural schematic diagram of the first adjustable focus laser cleaning galvanometer from a third view provided in an embodiment of the disclosed technology.

Specifically, the movable lens 32 is a beam expander, and the fixed lenses 31 are collimating focusing lenses. Here, for example, the position of the movable lens 32 may be manually or electrically adjusted, so as to obtain different focal lengths, focal depths and cleaning breadths as required by different applications during laser cleaning. Further, the same technical effect may also be achieved when the movable lens 32 is a collimating focusing lens and the fixed lenses 31 are beam expanders. It should be noted that, in order to achieve electrical adjustment, a driving module may be provided within the body 1 for automatic adjustment. In the present embodiment, the adjustable lens set 3 is provided with an adjusting knob 9, as shown in FIG. 3. The adjusting knob 9 is configured to adjust the distance between the movable lens 32 and the fixed lenses 31, and thereby the focal length of laser beams may be adjusted.

In the present embodiment, the laser cleaning breadth may be altered by the adjusting knob 9. For differently dimensioned objects, different focal depths and power levels may be provided for fine cleaning operation. Further, defocusing operation may be implemented for different objects to be cleaned. Even though the focal point of a beam is drawn away from the to-be-cleaned surface, the precise control over laser spot and laser power satisfies the energy densities required by different material surfaces.

It should be noted that the adjusting knob 9 may be embodied as a graduated scale or a display screen which may be implemented for digital display.

In addition, the adjusting knob 9 may be disposed in the front of the adjusting lens set 3 or the adjusting knob 9 may be disposed in the rear of the adjusting lens set 3.

In combination with FIG. 1, the adjustable lens set 3 is disposed between the laser 2 and the galvanometer 4 in the present embodiment.

In the present embodiment, the laser beam emitted from the laser 2 is firstly converted into a focused beam by the adjustable lens set 3, and then passes through the galvanometer 4, and the galvanometer 4 swings the beam for scanning cleaning.

In combination with FIG. 6 and FIG. 7, a reflector 5 is provided between the galvanometer 4 and the adjustable lens set 3 in the present embodiment.

In the present embodiment, the reflector 5 can reflect the focused beam emitted from the adjustable lens set 3 to the galvanometer 4.

The arrangement of the reflector 5 subjects the beam to two reflections, i.e. one by the galvanometer 4 and one by the reflector 5, so that the light exiting direction is parallel with the light entering direction.

A design of parallel light paths makes it more convenient to clean the surface of large objects compared with perpendicular light path design provided by the peers. It should be noted that, in practical implementation, the reflector 5 may be omitted, and two galvanometers 4 or one galvanometer 4 may be used to reflect the laser, in which case they constitute a perpendicular light emitting structure which is intended for certain working environments with special requirements.

Figure 9:
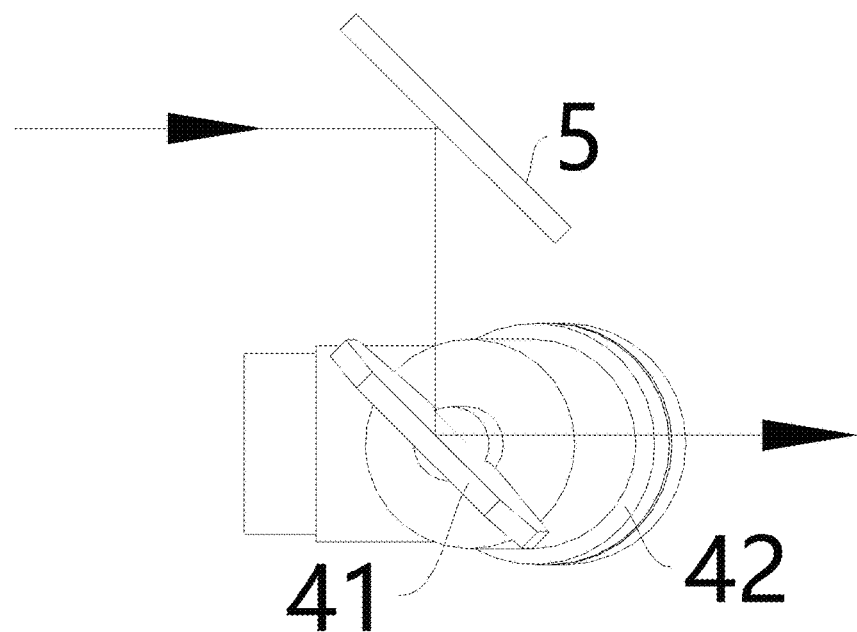
FIG. 9 is a structural schematic diagram of a galvanometer from a fourth view provided in an embodiment of the disclosed technology.

In combination with FIG. 9, the reflector 5 is provided at 45°, meaning, there is an included angle of 45° between the incident light and the surface of the reflector 5, so the light enters at 45° and exits at 45° too. In addition, the reflector 5 is disposed in parallel with the galvanometer lens 41.

It should be noted that, the number of the reflector 5 is not to be defined here. In practical implementation, there may be one reflector or none.

In addition, the number of the motor of the galvanometer 4 is not to be defined either. In practical implementation, there may be one or two motors. In the present embodiment, preferably, the galvanometer 4 has two motors (i.e. X-axis motor and Y-axis motor). The biaxial motors of the galvanometer 4 work at the same time for scanning cleaning. The arrangement of the galvanometer 4 with biaxial motors makes it possible to perform filling scanning in a plane. There may be various kinds of filling patterns and thus various types of scanning.

In other implementations, the galvanometer 4 may also be disposed between the laser 2 and the adjustable lens set 3 in other embodiments.

The adjustable lens set 3 is disposed between the galvanometer 4 and the surface of the object to be cleaned. The laser beam emitted from the laser 2 first passes through the galvanometer 4. The galvanometer 4 swings for the beam to scan. Then the beam is converted into a focused beam by the adjustable lens set 3, which is used for cleaning.

In addition, a reflector 5 may also be provided between the galvanometer 4 and the adjustable lens set 3 in the present embodiment. The reflector 5 may reflect the beam emitted from the galvanometer 4 to the adjustable lens set 3. The arrangement of the reflector 5 subjects the beam to two reflections, i.e. one by the galvanometer 4 and one by the reflector 5, so that the light exiting direction is parallel with the light entering direction.

In combination with FIG. 1, the adjustable focus laser cleaning galvanometer in the present embodiment further includes a protection cover 6. The protection cover 6 may be disposed in the front of the body 1.

The field lens of the existing cleaning devices may be directly exposed to the surface to be cleaned (the 'to-be-cleaned surface'). During cleaning, metal evaporants would adhere to the field lens, which compromises the cleaning effect and increases the maintenance cost.

In some embodiments, the arrangement of the protection cover 6 isolates the galvanometer 4 for protection, so that the galvanometer 4 stays clean during cleaning.

In addition, when the adjustable lens set 3 is disposed in the front of the body 1, the arrangement of this protection cover 6 may isolate the adjustable lens set 3 for protection, so that the adjustable lens set 3 stays clean during cleaning.

In combination with FIG. 3, the adjustable focus laser cleaning galvanometer in the present embodiment further includes an air-generating device 7. The air-generating device 7 is disposed on the body 1.

In the present embodiment, the air-generating device 7 may be disposed anywhere on the body 1, as long as it blows air inside and dissipates heat for the inventive device during cleaning.

In combination with FIG. 1, the body 1 is provided with a handle 8 in the present embodiment.

In the present embodiment, during cleaning, one may hold the inventive device by the handle 8 to perform mobile cleaning, so the use of the inventive device is more flexible. In addition, the arrangement of the handle 8 makes it easy to operate the inventive device.

In other embodiments, the body 1 may further be provided with a base. The base may be disposed at the bottom of the body 1, so that the inventive device may be fixed to a robot arm, a table frame or other structures through the base, for the purpose of fixed scanning cleaning.

When an adjustable focus laser cleaning galvanometer is cleaning, emitted light can often be reflected back to the laser 2 and damage the laser 2. To solve or alleviate this technical problem, the disclosed technology provides the following solutions. Referring to FIGS. 6-9, along the path of the light emitted from the laser 2, the adjustable lens set 3, the reflector 5 and the galvanometer 4 are arranged in this order. The light emitted from the laser 2 is first light, and the light emitted from the galvanometer 4 is second light. There is an included angle a between the first light and the second light.

As the light finally emitted from the adjustable focus laser cleaning galvanometer is neither parallel to nor coincident with the light emitted from the laser 2, when the light emitted from the laser 2 is perpendicular to the to-be-cleaned surface 13 (e.g., in combination with FIG. 14), the light emitted from the galvanometer 4 is inclined relative to the to-be-cleaned surface 13, and in this way, the light reflected by the to-be-cleaned surface 13 is not likely to be reflected back to the laser 2.

Optionally, $8°\le a \le 45°$. In practical implementations, the angle a may be 8°, 10°, 20°, 35°, 40° or 45°, etc.

In addition, in other embodiments, when the galvanometer 4, the reflector 5 and the adjustable lens set 3 are arranged in this order along the path of the light emitted from the laser 2, the light emitted from the laser 2 is first light, and the light emitted from the adjustable lens set 3 is third light. There is an included angle b between the first light and the third light.

Similarly, such arrangement may also achieve the corresponding technical effect.

Optionally, 8°≤b≤45°. In practical implementation, the angle b may be 8°, 10°, 20°, 35°, 40° or 45°, etc.

Figure 8:
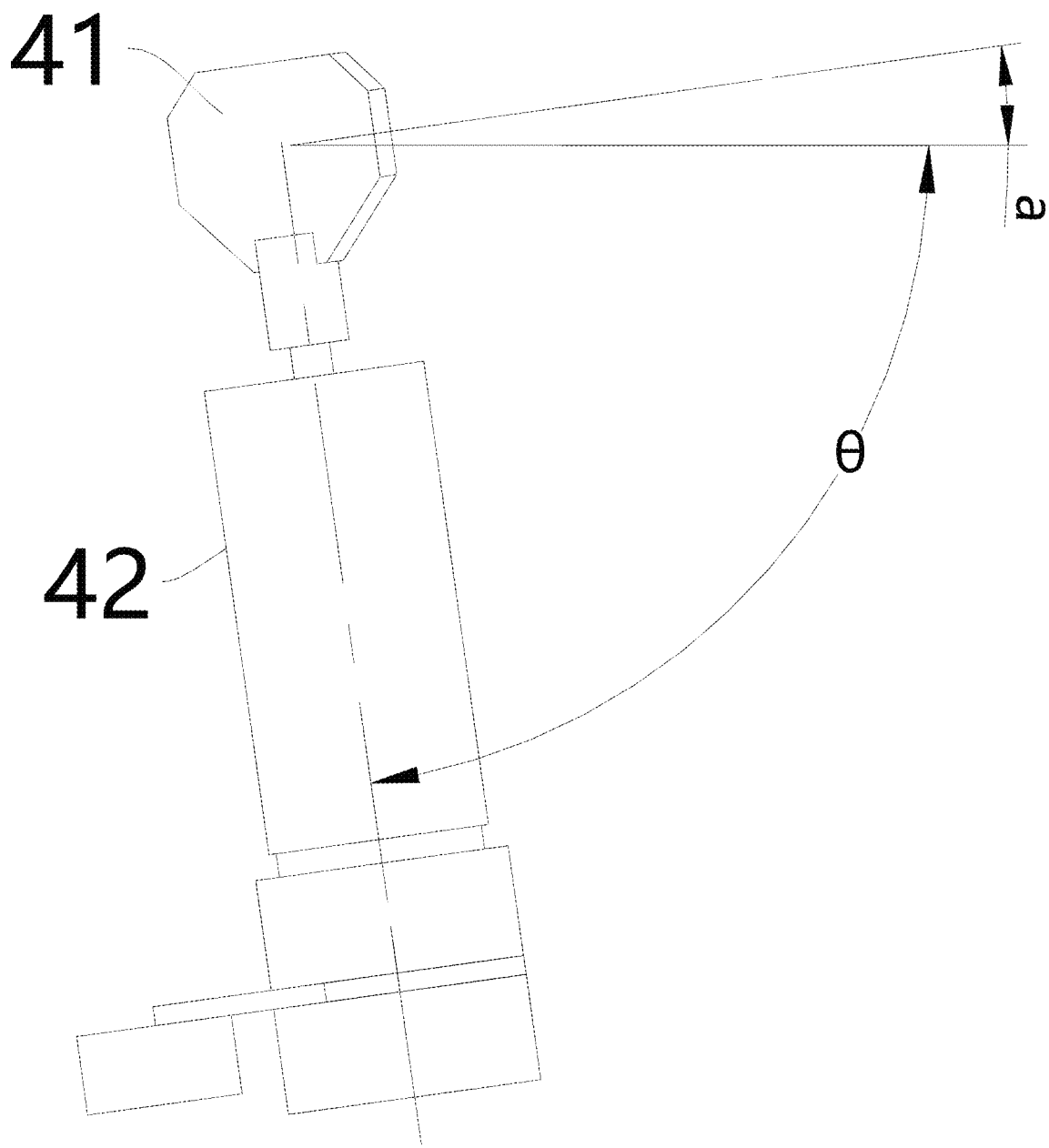
FIG. 8 is a structural schematic diagram of a galvanometer from a third view provided in an embodiment of the disclosed technology.

In combination with FIG. 8, the rotation axis of the output shaft of the galvanometer motor 42 is parallel to or coincident with the reflecting surface of the galvanometer lens 41. The light emitted from the laser 2 is first light, and there is an included angle θ between the first light and the rotation axis.

By inclining the galvanometer motor 42, the galvanometer support is inclined, and thus the galvanometer 41 is inclined, so that when the laser 2 emits horizontal light, the light reflected by the galvanometer lens 41 is inclined relative to the horizontal plane.

Optionally, 45°≤θ≤82°. In practical implementation, the angle θ may be 45°, 50°, 60°, 65°, 70° or 82°, etc. As a+θ=90°, a may be calculated accordingly.

Figure 14:
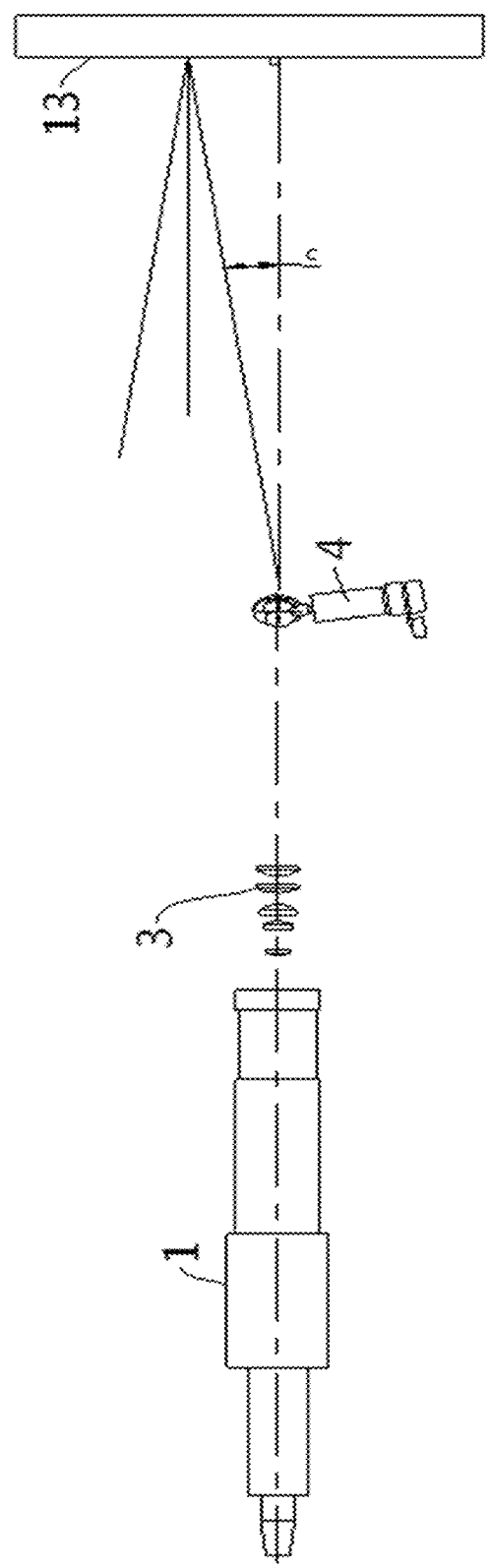
FIG. 14 is a schematic diagram of the first adjustable focus laser cleaning galvanometer in working condition provided in an embodiment of the disclosed technology.

In combination with FIG. 14, the light emitted from the laser 2 is first light, and the light finally emitted from the adjustable focus laser cleaning galvanometer is fourth light. There is an included angle c between the first light and the fourth light.

It is appreciated that inclining the galvanometer 4, the reflector 5 and the adjustable lens set 3, etc. makes it possible that the light finally emitted from the adjustable focus laser cleaning galvanometer is neither parallel to nor coincident with the light emitted from the laser 2, and thus corresponding technical effect may be achieved.

Optionally, 8°≤c≤45°. In practical implementation, the angle c may be 8°, 10°, 20°, 35°, 40° or 45°, etc.

In actual use, due to different inclining directions or different placements, when the light emitted from the laser 2 is along the horizontal line, the exiting light might be above or below the horizontal line.

Figure 10:
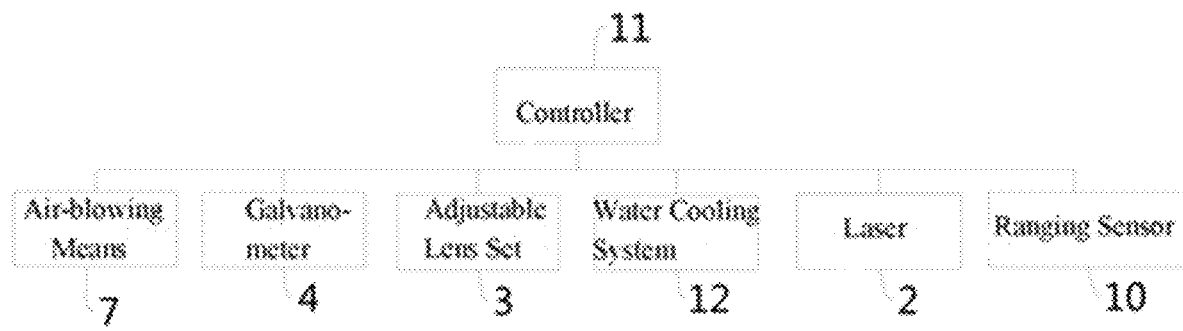
FIG. 10 is a functional block diagram of the first adjustable focus laser cleaning galvanometer provided in an embodiment of the disclosed technology.

In combination with FIG. 10, the adjustable focus laser cleaning galvanometer in the present embodiment further includes a water cooling system 12. The water cooling system 12 includes a cooling source and a water cooling pipe communicated with the cooling source. The water cooling pipe is disposed within the body 1.

Water cooling quickly takes away the heat accumulated during operation, so that the operating temperature of the system is kept below the defined maximum temperature, making the operation more stable, the service life longer, and the cleaning quality better. The implementation of the cooling system is not limited to water cooling. A temperature sensor, a cooling fin, a radiating fin or a fan may be provided and achieve the same cooling effect. Normally, arranging a water cooling pipe within the galvanometer support can quickly take way the heat accumulated within the galvanometer motor 42 during operation, so that the galvanometer motor 42 operates at a temperature below the maximum operating temperature and thus the system can operate continuously and stably and the cleaning quality is improved.

In combination with FIG. 10, the adjustable focus laser cleaning galvanometer further includes a ranging sensor 10 and a controller 11. The ranging sensor 10 is disposed on the body 1. The ranging sensor 10 is configured to detect the distance between the body 1 and the to-be-cleaned surface 13 and feeds a detection signal back to the controller 11. The controller 11 is configured to perform control over the adjustable lens set 3 and/or galvanometer 4 according to the detection signal.

Specifically, the adjustable lens set 3 is electrically driven by a driving module provided in the body 1. And the galvanometer 4 is driven by the galvanometer motor 42. Therefore, normally the controller 11 is electrically connected to the driving module and/or galvanometer motor 42 for control. With the controller 11, automatic adjustment is possible, and thus automated and intelligent cleaning is possible, which means the laser cleaning is more flexible and convenient.

In combination with FIG. 10, the controller 11 is electrically connected to the air-generating device 7, the galvanometer 4, the adjustable lens set 3, the water cooling system 12, the laser 2 and the ranging sensor 10 in the present embodiment. This makes automatic adjustment possible. Normally, the body 1 may be provided with a touch screen which may display corresponding data in real time and make real-time adjustment possible.

The adjustable focus laser cleaning galvanometer provided by the present embodiment works according to the following principle.

If it is to clean the to-be-cleaned surface 13, normally the body 1 is kept perpendicular to the to-be-cleaned surface 13. In this case, the light emitted from the laser 2 is perpendicular to the to-be-cleaned surface 13, while the light finally emitted from the adjustable focus laser cleaning galvanometer is inclined relative to the to-be-cleaned surface 13, so that the light reflected by the to-be-cleaned surface 13 will not likely go back to the laser 2. The ranging sensor 10 detects the distance between the to-be-cleaned surface 13 and the body 1 and feeds a signal back to the controller 11 which will perform control over the adjustable lens set 3 to adjust the focal length to the to-be-cleaned surface 13. In addition, the controller 11 may also perform control over the air-blowing of the air-generating device 7, the swinging of the galvanometer lens 41, the cooling of the water cooling system 12 and the emission power of the laser 2.

Generally, the body 1 may be provided therein with a temperature sensor which is electrically connected to the controller 11 so that the temperature within the body 1 is monitored in real time and real-time adjustment is possible with the controller 11.

Adjustable focus laser cleaning galvanometers consistent with the disclosed technology may provide at least one of the following advantages.

Via front focus laser cleaning, the light path is modified by adjusting the adjustable lens set 3, and thus it is possible to obtain different focal lengths, focal depths and cleaning breadths. The cleaning breadth may reach 600 mm or even more. Therefore, the adjustable focus laser cleaning galvanometer makes it possible to clean in a large breadth and thus significantly improves the efficiency of laser cleaning. The arrangement of the adjustable lens set 3 makes it possible to flexibly alter the focal length, focal depth and breadth. Such arrangement has obvious advantages over the fixed focus field lens laser cleaning on the market. Due to its flexible adjustability, it is adapted to various cleaning requirements, and thus has a wider application scope and is more flexible. It makes laser cleaning quick and convenient for objects with deep grooves or with a combination of high and low surfaces.

A high reflection resistant light path design effectively protects the laser 2 from high reflection and thus prolongs the service life of the laser 2.

The additional ranging sensor 10 may automatically detect the distance between the cleaning head on the body 1 and the to-be-cleaned surface 13 and thus makes it possible to make self-adaptive adjustment to the working focus so that the focal spot on the to-be-cleaned surface 13 remains in its best condition and thus automatic cleaning is realized.

The heat produced by the operation of the galvanometer motor 42 itself plus the laser heat absorbed by the reflector 5 and the galvanometer lens 41 rapidly increase the temperature within the inventive device, and a long time of operation will compromise the service life of the motor and the stability of the system. The arrangement of the air-generating device 7 and the water cooling system 12 improves the heat dissipation efficiency by air-blowing and water cooling, so the temperature within the inventive device remains within a suitable range.

Figure 11:
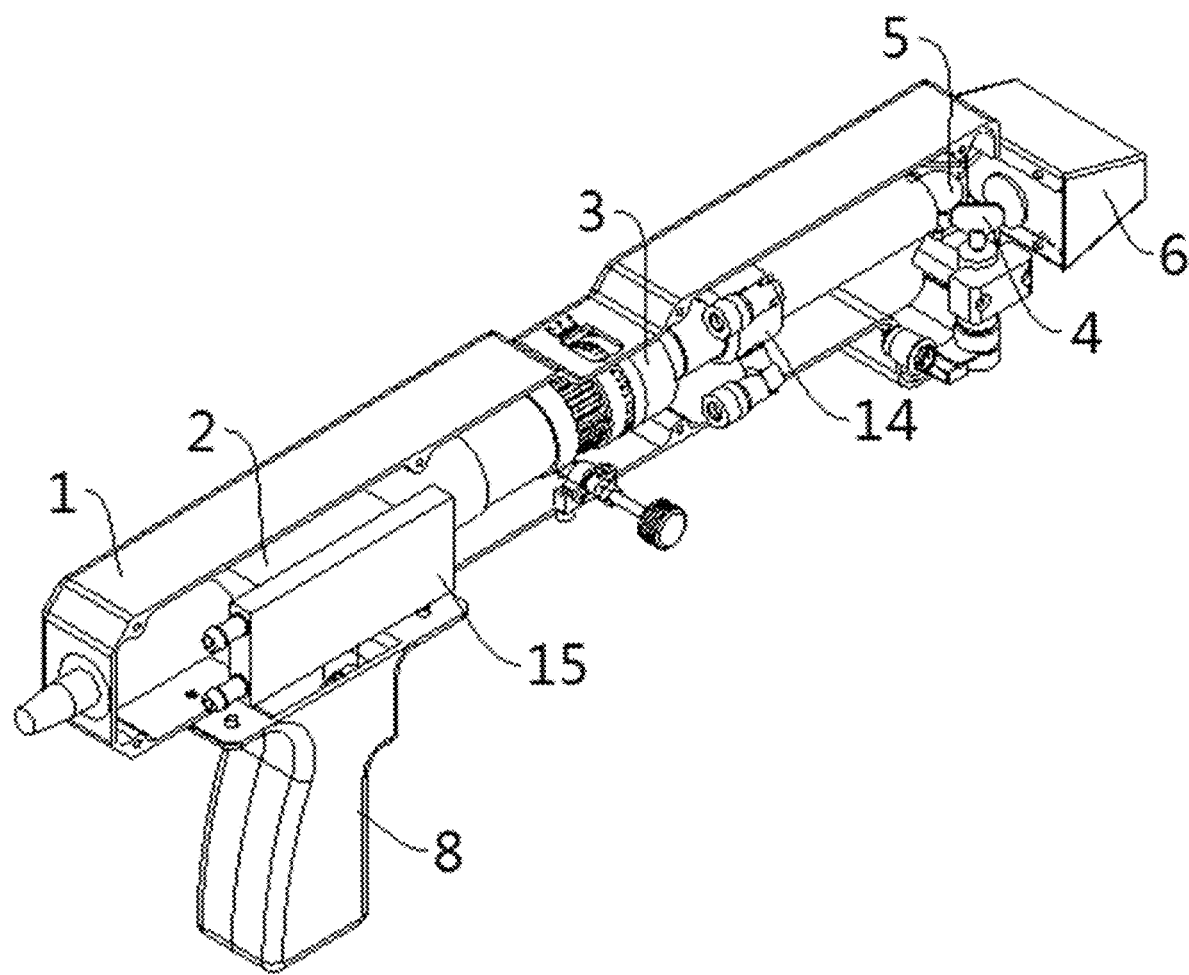
FIG. 11 is a structural schematic diagram from a first view of a second adjustable focus laser cleaning galvanometer provided in an embodiment of the disclosed technology.
Figure 12:
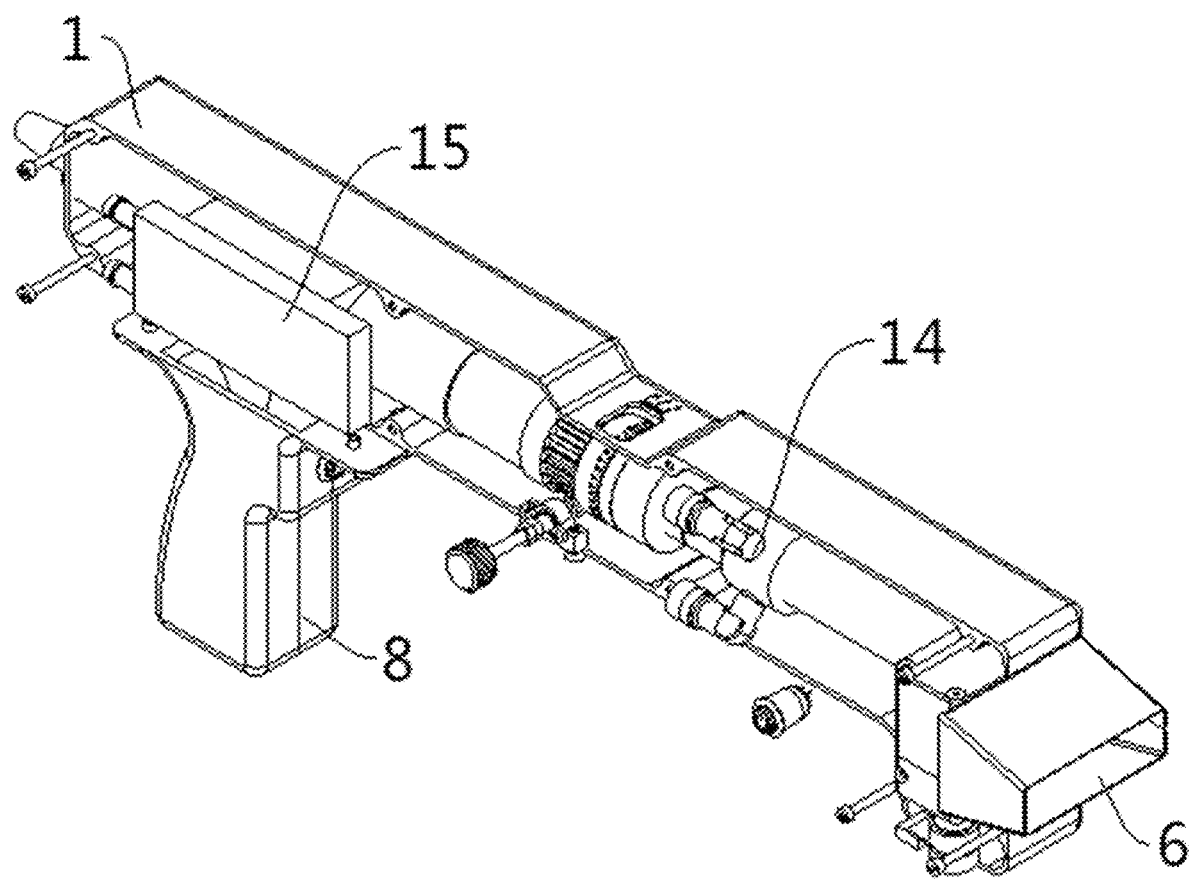
FIG. 12 is a structural schematic diagram from a second view of the second adjustable focus laser cleaning galvanometer provided in an embodiment of the disclosed technology.
Figure 13:
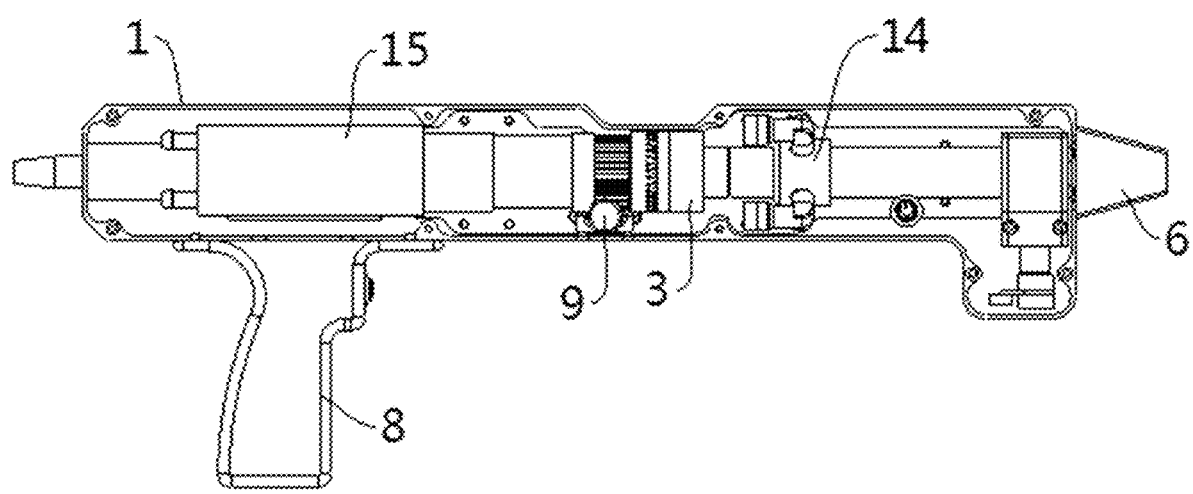
FIG. 13 is a structural schematic diagram from a third view of the second adjustable focus laser cleaning galvanometer provided in an embodiment of the disclosed technology.

Referring to FIGS. 11 to 13, the present embodiment further provides a second adjustable focus laser cleaning galvanometer which is substantially the same with the first adjustable focus laser cleaning galvanometer in structure, except that the second adjustable focus laser cleaning galvanometer further includes a first heat dissipation module 14 and the first heat dissipation module 14 is provided in the periphery of the adjustable lens set 3.

Specifically, the first heat dissipation module 14 may have a water-cooling structure or an air-cooling structure or may be a refrigeration sheet. In the present embodiment, water-cooling structure is employed. The first heat dissipation module 14 includes a body, an inflow tube head and an outflow tube head. The body leans against the periphery of the adjustable lens set 3. The inflow tube head is configured to let water in and the outflow tube head is configured to let water out. During the course where low-temperature water flows in through the inflow tube head, passes through the body and exits from the outflow tube head, it takes away the heat dissipated from the adjustable lens set 3 during work.

More specifically, the body of the first heat dissipation module 14 is arranged to be close to the fixed lens 31 and the body of the first heat dissipation module 14 is ring-shaped and surrounds the periphery of the adjustable lens set 3.

In addition, the adjustable focus laser cleaning galvanometer further includes a second heat dissipation module 15 and the second heat dissipation module 15 is provided to be close to the laser 2.

Similarly, the second heat dissipation module 15 may have a water-cooling structure or an air-cooling structure or may be a refrigeration sheet. In the present embodiment, water-cooling structure is employed. The second heat dissipation module 15 includes a body, an inflow tube head and an outflow tube head. The body is block-shaped and leans against the laser output port of the laser 2. The inflow tube head is configured to let water in and the outflow tube head is configured to let water out. During the course where low-temperature water flows in through the inflow tube head, passes through the body and exits from the outflow tube head, it takes away the heat dissipated from the laser output port of the laser 2 during work.

The present embodiment further provides a cleaning system which includes the above adjustable focus laser cleaning galvanometer.

The cleaning system has all the functions as the adjustable focus laser cleaning galvanometer does.

The cleaning system may also include a robot arm, by which the adjustable focus laser cleaning galvanometer may be hold and thus a targeted object may be precisely cleaned.

Figure 15:
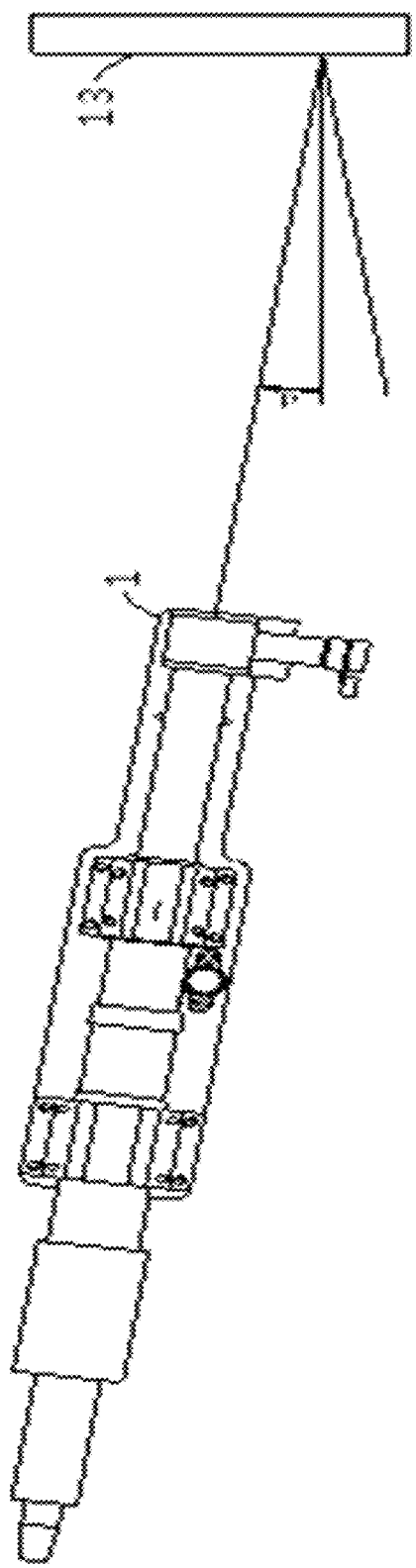
FIG. 15 is a schematic diagram of a third adjustable focus laser cleaning galvanometer in working condition provided in an embodiment of the disclosed technology.

Referring to FIG. 14 and FIG. 15, the present embodiment further provides a cleaning method which uses the above adjustable focus laser cleaning galvanometer. The method includes:

directing the light finally emitted from the adjustable focus laser cleaning galvanometer to the to-be-cleaned surface 13 in a way that there is an included angle between the light and the plane perpendicular to the to-be-cleaned surface 13;

performing control over the adjustable lens set 3 to adjust the focal length of the beam.

In combination with FIG. 14, when the light emitted from the laser 2 is along the horizontal line, the galvanometer lens 41 in FIG. 14 is inclined relative to the horizontal line so that the final light as emitted is inclined relative to the horizontal line, meaning, there is an included angle between the two, and for the included angle c, $8° \leq c \leq 45°$.

In combination with FIG. 15, when the light emitted from the laser 2 is parallel to or coincident with the final light as emitted, the entire inventive device is arranged to be inclined relative to the horizontal line, meaning, there is an included angle between the light emitted from the laser 2 and the horizontal line, and for the included angle d, $8° \leq d \leq 45°$. The included angle d may be 8°, 10°, 15°, 25°, 35°, 42°, 45°, etc.

Various Illustrative Embodiments

Referring to FIG. 1, FIG. 1 illustrates an adjustable focus laser cleaning galvanometer which includes a body 1, a laser 2, an adjustable lens set 3, a galvanometer 4, a reflector 5, a protection cover 6 and a handle 8. The laser 2, the adjustable lens set 3, the galvanometer 4, the reflector 5, the protection cover 6 and the handle 8 are all disposed on the body 1. The adjustable lens set 3 is configured to convert a laser beam emitted from the laser 2 into a focused beam and adjust the focal length of the beam. The galvanometer 4 may swing on the body 1. The reflector 5 is disposed between the galvanometer 4 and the adjustable lens set 3. The protection cover 6 is disposed in the front of the body 1.

Referring to FIG. 2 in combination with FIG. 4 and FIG. 5, the adjustable lens set 3 includes a fixed lens 31 and a movable lens 32. The movable lens 32 is axially movable relative to the fixed lens 31. An adjusting knob 9 is provided on the adjustable lens set 3. The adjusting knob 9 is configured to adjust the distance between the movable lens 32 and the fixed lens 31 and thus adjust the focal length of the beam.

Referring to FIG. 3, the adjustable focus laser cleaning galvanometer in FIG. 3 also includes an air-generating device 7. The air-generating device 7 is disposed on the body 1 and the air-generating device 7 is disposed in the rear of the body 1.

Referring to FIG. 4, FIG. 4 illustrates a fixed lens 31 with five lenses.

Referring to FIG. 5, FIG. 5 illustrates a fixed lens 31 with four lenses.

Referring to FIG. 6 and FIG. 7, the galvanometer 4 includes a galvanometer lens 41 and a galvanometer motor 42. The galvanometer motor 42 is disposed on the body 1. The galvanometer motor 42 is configured to drive the galvanometer lens 41 to swing. More specifically, the galvanometer lens 41 is connected to the output shaft of the galvanometer motor 42 via a galvanometer support so as to transmit the driving power. In addition, the reflector 5 is disposed between the adjustable lens set 3 and the galvanometer lens 41.

Referring to FIG. 8, the rotation axis of the output shaft of the galvanometer motor 42 is parallel to or coincident with the reflecting surface of the galvanometer lens 41. The light emitted from the laser 2 is first light, and there is an included angle θ between the first light and the rotation axis, 45°≤θ≤82°.

Referring to FIG. 9, the reflector 5 is provided at 45°, meaning, there is an included angle of 45° between the incident light and the surface of the reflector 5, so the light enters at 45° and exits at 45° too. In addition, the reflector 5 is disposed in parallel with the galvanometer lens 41.

Referring to FIG. 10, the adjustable focus laser cleaning galvanometer includes a controller 11, an air-generating device 7, a galvanometer 4, an adjustable lens set 3, a water-cooling system 12, a laser 2 and a ranging sensor 10. The air-generating device 7, the galvanometer 4, the adjustable lens set 3, the water-cooling system 12, the laser 2 and the ranging sensor 10 are all electrically connected to the controller 11.

Referring to FIG. 11 and FIG. 12, FIG. 11 illustrates an adjustable focus laser cleaning galvanometer which includes a body 1, a laser 2, an adjustable lens set 3, a galvanometer 4, a reflector 5, a protection cover 6, a handle 8, a first heat dissipation module 14 and a second heat dissipation module 15. The laser 2, the adjustable lens set 3, the galvanometer 4, the reflector 5, the protection cover 6, the handle 8, the first heat dissipation module 14 and the second heat dissipation module 15 are all disposed on the body 1. The adjustable lens set 3 is configured to convert a laser beam emitted from the laser 2 into a focused beam and adjust the focal length of the beam. The galvanometer 4 may swing on the body 1. The reflector 5 is disposed between the galvanometer 4 and the adjustable lens set 3. The protection cover 6 is disposed in the front of the body 1. The first heat dissipation module 14 is disposed in the periphery of the adjustable lens set 3. The second heat dissipation module 15 is disposed to be close to the laser 2.

Referring to FIG. 13 in combination with FIG. 4 and FIG. 5, the adjustable lens set 3 includes a fixed lens 31 and a movable lens 32. The movable lens 32 is axially movable relative to the fixed lens 31. An adjusting knob 9 is provided on the adjustable lens set 3. The adjusting knob 9 is configured to adjust the distance between the movable lens 32 and the fixed lens 31 and thus adjust the focal length of the beam.

Referring to FIG. 14, the light finally emitted from the adjustable focus laser cleaning galvanometer is directed to the to-be-cleaned surface 13 in a way that there is an included angle between the light and the plane perpendicular to the to-be-cleaned surface 13. The light emitted from the laser 2 is along the horizontal line, and the galvanometer lens 41 of the galvanometer 4 in FIG. 14 is inclined relative to the horizontal line so that the light finally emitted is inclined relative to the horizontal line, meaning, there is an included angle between the two, and for the included angle c, 8°≤c≤45°.

Referring to FIG. 15, the light finally emitted from the adjustable focus laser cleaning galvanometer is directed to the to-be-cleaned surface 13 in a way that there is an included angle between the light and the plane perpendicular to the to-be-cleaned surface 13. The light emitted from the laser 2 is parallel to or coincident with the light finally emitted, and the entire inventive device is arranged to be inclined relative to the horizontal line, meaning, there is an included angle between the light emitted from the laser 2 and the horizontal line, and for the included angle d, 8°≤d≤45°.

As last, it should be noted that the above embodiments are provided only to explain features, aspects and/or technical solutions of the disclosed technology, rather than to limit the innovations set forth herein. Although the disclosed technology is described in details with reference to the aforementioned examples, those ordinarily skilled in the art should appreciate that they may still make modifications to the technical solutions contained in those examples, or make equivalent replacements to some or all of the technical features therein. Such modifications or replacements should not depart from the essence of innovations or the respective technical solutions and/or from the scope of the technical solutions in the examples of the disclosed technology.

INDUSTRIAL APPLICABILITY

In sum, the disclosed technology provides an adjustable focus laser cleaning galvanometer, a cleaning system and a cleaning method. The adjustable focus laser cleaning galvanometer has a simple structure, a low manufacturing cost and can address the technical problem that the focal length is not adjustable in the laser cleaning scanners in the prior art.

What is claimed is:

1. An adjustable focus laser cleaning galvanometer comprising:
    a body;
    a laser;
    an adjustable lens set configured to convert a laser beam emitted from the laser into a focused beam and adjust a focal length of the beam, wherein both the adjustable lens set and the laser are mounted on the body;
    a galvanometer mounted on the body and configured to swing on the body, the galvanometer comprising a galvanometer lens and a galvanometer motor, the galvanometer motor mounted on the body and is configured to drive the galvanometer lens to swing;
    a reflector between the galvanometer and the adjustable lens set, the reflector configured to reflect the focused beam emitted from the adjustable lens set to the galvanometer,
    wherein the adjustable focus laser cleaning galvanometer is configured to clean objects with grooves or with a combination of high and low surfaces, and achieve a working focal depth of greater than 100 mm,
    wherein a rotation axis of an output shaft of the galvanometer motor is parallel to or coincident with a reflecting surface of the galvanometer lens, and
    wherein light emitted from the laser is first light and there is an included angle (θ) between the first light and the rotation axis wherein 45°≤θ≤82°;
    a first heat dissipation module disposed in a periphery of the adjustable lens set; and
    a second heat dissipation module disposed to be close to the laser.

2. The adjustable focus laser cleaning galvanometer according to claim 1, wherein the adjustable lens set comprises fixed lenses and a movable lens, and the movable lens is axially movable relative to the fixed lenses.

3. The adjustable focus laser cleaning galvanometer according to claim 2, wherein the adjustable lens set is provided thereon with an adjusting knob, the adjusting knob is configured to adjust a distance between the movable lens and the fixed lenses and thus to adjust the focal length of the beam.

4. The adjustable focus laser cleaning galvanometer according to claim 1, wherein the adjustable lens set is disposed between the laser and the galvanometer or the galvanometer is disposed between the laser and the adjustable lens set.

5. The adjustable focus laser cleaning galvanometer according to claim 1, wherein along a path of light emitted from the laser, the adjustable lens set, the reflector and the galvanometer are disposed sequentially, light emitted from the galvanometer is second light, and there is an included angle (a) between the first light and the second light.

6. The adjustable focus laser cleaning galvanometer according to claim 5, wherein $8°≤a≤45°$.

7. The adjustable focus laser cleaning galvanometer according to claim 1, wherein along a path of light emitted from the laser, the galvanometer, the reflector and the adjustable lens set are disposed sequentially, light emitted from the adjustable lens set is third light, and there is an included angle (b) between the first light and the third light.

8. The adjustable focus laser cleaning galvanometer according to claim 7, wherein $8°≤b≤45°$.

9. The adjustable focus laser cleaning galvanometer according to claim 1, wherein the adjustable focus laser cleaning galvanometer further comprises an air-blowing means which is disposed on the body.

10. The adjustable focus laser cleaning galvanometer according to claim 1, wherein light finally emitted from the adjustable focus laser cleaning galvanometer is fourth light, and there is an included angle (c) between the first light and the fourth light.

11. The adjustable focus laser cleaning galvanometer according to claim 10, wherein $8°≤c≤45°$.

12. The adjustable focus laser cleaning galvanometer according to claim 1, wherein the adjustable focus laser cleaning galvanometer further comprises a water cooling system which comprises a cooling source and a water cooling pipe which is communicated with the cooling source and disposed within the body.

13. The adjustable focus laser cleaning galvanometer according to claim 1, wherein the adjustable focus laser cleaning galvanometer further comprises a ranging sensor and a controller, the ranging sensor is disposed on the body and is configured to detect the distance between the body and a to-be-cleaned surface and feed a detection signal back to the controller which is configured to control the adjustable lens set and/or the galvanometer according to the detection signal.

14. A cleaning system, wherein the cleaning system comprises the adjustable focus laser cleaning galvanometer according to claim 1.

* * * * *